(12) United States Patent
Pak et al.

(10) Patent No.: US 7,518,045 B2
(45) Date of Patent: Apr. 14, 2009

(54) METHOD OF PREPARING CARBON NANOCAGES

(75) Inventors: Chan-ho Pak, Seoul (KR); Hyuk Chang, Seongnam-si (KR); Jian Nong Wang, Shanghai (CN)

(73) Assignee: Samsung SDI Co., Ltd., Suwon (KR)

( * ) Notice: Subject to any disclaimer, the term of this patent is extended or adjusted under 35 U.S.C. 154(b) by 609 days.

(21) Appl. No.: 11/140,979

(22) Filed: Jun. 1, 2005

(65) Prior Publication Data

US 2006/0062712 A1   Mar. 23, 2006

(30) Foreign Application Priority Data

Sep. 20, 2004   (KR) .................... 10-2004-0075078

(51) Int. Cl.
*C01B 31/04* (2006.01)

(52) U.S. Cl. .................... 977/843; 423/445 R; 423/448

(58) Field of Classification Search ............. 423/447.1, 423/447.3, 445 R, 448; 977/734, 735, 842, 977/843

See application file for complete search history.

(56) References Cited

U.S. PATENT DOCUMENTS 6,063,243 A   5/2000   Zettl et al.

2003/0167778 A1   9/2003   Bradley et al.
2006/0073275 A1*  4/2006   Maruyama et al. ....... 427/248.1

FOREIGN PATENT DOCUMENTS

| CN | 1327943 | 12/2001 |
|----|---------|---------|
| CN | 1448335 | 10/2003 |
| CN | 1504407 | 6/2004 |
| DE | 197 40 389 A1 | 3/1999 |
| JP | 2004-044064 | 2/2004 |
| WO | WO/2004/060800 | * 7/2004 |

* cited by examiner

*Primary Examiner*—Wayne Langel
*Assistant Examiner*—Brittany M Martinez
(74) *Attorney, Agent, or Firm*—H.C. Park & Associates, PLC

(57) ABSTRACT

The present invention provides a simple method of mass producing high purity carbon nanocages. The method of preparing carbon nanocages comprises introducing an inert gas into a reactor equipped with a spray nozzle and raising the temperature of the reactor to a pyrolysis temperature of a catalyst compound. The method further comprises spraying a reactant including the catalyst compound and a carbon-containing compound into the reactor through the spray nozzle, wherein the ratio of a space velocity of the inert gas to a space velocity of the reactant is 100 or more.

9 Claims, 2 Drawing Sheets

METHOD OF PREPARING CARBON NANOCAGES

CROSS REFERENCE TO RELATED APPLICATION

This application claims priority to and the benefit of Korean Patent Application No. 10-2004-0075078, filed on Sep. 20, 2004, in the Korean Intellectual Property Office, the disclosure of which is incorporated herein in its entirety by reference.

BACKGROUND OF THE INVENTION

1. Field of the Invention

The present invention relates to carbon nanomaterials, and in particular, to a method of preparing carbon nanocages.

2. Description of the Related Art

Since fullerenes were discovered by Harold Kroto et al. in 1985 and the carbon nanotube was discovered by Sumio Iijima in 1991, carbon nanostructures have attracted significant interest.

Carbon nanocages are polyhedral carbon clusters that are comprised of several graphite layers. The carbon nanocages have a specific fullerene ball-within-a ball structure and optoelectronic properties. These properties make carbon nanocages appropriate for use as a medicinal grade active carbon, a light and heat absorbent material, an electromagnetic shielding material, an organic luminous material, a solar energy absorbent material, a catalyst, a sensor, a carbon electrode of lithium battery, a nanoscale composite material having superior heat conductivity and specific electrical properties, and a nanoscale carbon powder for printing, for example.

However, a method of mass-producing high purity carbon nanocages has not yet been developed. Although carbon nanocages can be prepared using conventional techniques such as carbon-arcing, ultrasonic treatment, high-energy irradiation, thermal treatment of fullerene black and plasma torch process, the yield of nanocage products is low and while the yield of various byproducts such as carbon nanotubes, carbon fibers and amorphous carbon is too high.

Catalytic chemical vapor deposition (CVD) is considered to be the most effective method for mass-producing carbon nanomaterials at a low cost. This method has superior controllability when compared to other methods.

A method of preparing carbon nanomaterials using an inexpensive, nontoxic, low energy carbon source is a goal that synthetic chemists have long pursued.

U.S. Pat. No. 6,063,243 discloses an arc discharge process that can produce carbon nanotubes along with nanoparticles as a byproduct. DE Patent No. 19740389 uses a catalytic deposition process with a laser beam to prepare carbon nanofibers, carbon nanoparticles and fullerenes. However, this method is costly and the yield of products is low. In addition, it is difficult to purify the products that are prepared by this method.

SUMMARY OF THE INVENTION

The present invention provides a simple method of synthesizing large quantities of high purity carbon nanocage product. As used herein, the term "carbon nanocage" refers to a polyhedral particle that is comprised of several graphite layers and has at least one hole in its surface.

The synthesis and purification method of the present invention are simple and convenient, in part because an unsupported catalyst is used. Further, inert gases other than hydrogen may be used in the process, which lowers energy costs and increases the safety of the production process.

In addition, the apparatus that is used in the present invention is readily miniaturized and may easily be operated using an integrated spray nozzle, which ensures a uniform carbon nanocage structure for the product. Since a catalyst and a carbon source can be continuously supplied to the reactor, the product can also be discharged from the reactor in a continuous manner.

Additional features of the invention will be set forth in the description which follows, and in part will be apparent from the description, or may be learned by practice of the invention.

The present invention discloses a method of preparing carbon nanocages that comprises introducing an inert gas into a reactor that is equipped with a spray nozzle. In addition, the method includes raising the temperature of the reactor to a pyrolysis temperature of a catalyst compound. The method further comprises spraying a reaction material including the catalyst compound and a carbon-containing compound into the reactor through the spray nozzle. The ratio of the space velocity of the inert gas to the space velocity of the reaction material is 100 or more.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
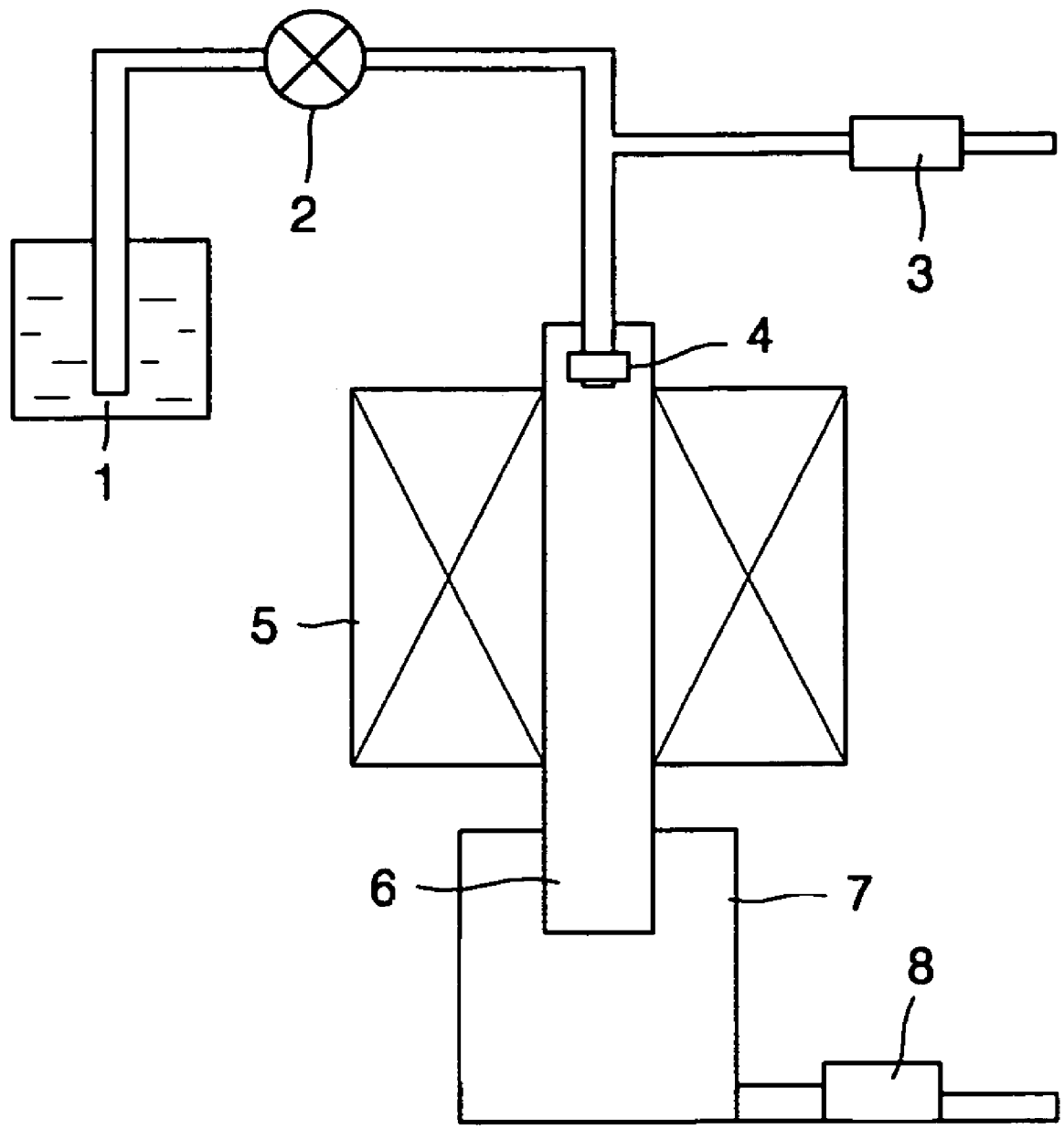
FIG. 1 is a schematic diagram of an apparatus that is used in an exemplary embodiment of the present invention.

A method for preparing carbon nanocages according to an exemplary embodiment of the present invention comprises introducing an inert gas into a reactor that is equipped with a spray nozzle. The method further comprises raising the temperature of the reactor to a pyrolysis temperature of a catalyst compound and spraying a reactant into the reactor through the spray nozzle. The reactant comprises the catalyst compound and a carbon-containing compound. The ratio of the space velocity of the inert gas to the space velocity of the reactant is 100 or more.

As used herein, the term "space velocity of the inert gas" refers to a value obtained by dividing the flow rate of the inert gas by the volume of the reactor. The term "space velocity of the reactant" refers to a value obtained by dividing the flow rate of the reactant by the volume of the reactor. The term "ratio of the space velocity of the inert gas to the space velocity of the reactant" refers to a value obtained by dividing the space velocity of the inert gas by the space velocity of the reactant.

The inert gas acts as a carrier gas since it has a higher space velocity than the reactant. Thus, the residence time of the mixture of the inert gas and the reactant in the reactor is dependent on the space velocity of the inert gas.

In the method of the present embodiment, since the catalyst compound and the carbon-containing compound are supplied into the reactor through the spray nozzle, the production of a catalyst and the formation of carbon nanomaterials occur simultaneously and rapidly. As a result, a carbon nanocage structure is selected to be a predominant product over such forms as the carbon nanotube. Also, since the growth of nuclei and the growth of carbon structures occur simultaneously, the resulting carbon nanocages have a uniform structure.

In addition, the concentration of carbon in the mixture of the inert gas and the reactant that is suitable for selectively forming carbon nanocages is obtained by maintaining the ratio of the space velocity of the inert gas to the space velocity of the reactant at 100 or more. Thus, the method of preparing carbon nanocages of the present embodiment may have superior reproducibility which makes it suitable for mass-production.

There is no maximum value for the ratio of the space velocity of the inert gas to the space velocity of the reactant. However, if the ratio is too high, carbonization does not occur, and thus nanocage structures cannot be formed. In view of this, the ratio may typically be 25,000 or less.

The spray nozzle that is used in the method of the present embodiment is an entrance for supplying a liquid phase reactant, for example, into the reactor in solution or dispersion form. The position of the spray nozzle in the reactor is not limited. For example, the spray nozzle can be installed in the upper, middle, or lower portions of the reactor. The spray nozzle can have any shape that disperses the reactant.

Alternatively, the reactant can be supplied into the reactor as a gas mixture.

The catalyst compound may comprise a metal, such as Fe, Co, Ni, for example. Such a metal-containing compound is pyrolyzed in the reactor to form metal particles. The resulting metal particles act as catalysts for pyrolysis of the carbon-containing compound to form carbon nanocages. Examples of the catalyst compound may include, but are not limited to metal-containing carbonyl compounds, and metallocene. Examples of the metal-containing carbonyl compounds may include iron carbonyl, nickel carbonyl, cobalt carbonyl, and a mixture thereof.

The carbon-containing compound can be converted into a carbon nanostructure through pyrolysis. The carbon-containing compound is sprayed with the catalyst into the reactor, and is then readily vaporized to be catalytically pyrolyzed. The pyrolysis process decomposes the carbon-containing compound using the catalyst. The resulting carbon is crystallized around the catalyst to form nanostructures, which mainly take a nanocage form. Examples of the carbon-containing compounds may include, but are not limited to methanol, ethanol, acetone, or a mixture thereof.

If the concentration of the catalyst compound in the reactant is too low, the carbon may not decompose, and thus nanostructures cannot be formed. If the amount of the catalyst compound is too high, other structures in addition to nanocages may be formed. Thus, the concentration of the catalyst compound in the reactant is typically about 10-50 parts by volume, and preferably about 10-30 parts by volume, and more preferably about 15-25 parts by volume based on 100 parts by volume of the carbon-containing compound.

The inert gas that is introduced into the reactor may include, but is not limited to helium, neon, argon, xenon, nitrogen or a mixture thereof. The presence of the inert gas in the reactor prevents the undesired oxidation of the reactant and the resulting carbon, and the flow rate of the reaction mixture in the reactor can be increased. Thus, the residence time of the resulting carbon nanostructures is shortened to selectively form carbon nanocages.

The inert gas may be introduced into the reactor through the spray nozzle. Alternatively, the reactor may have a separate inlet for introducing the inert gas.

The inert gas may be discontinuously or continuously introduced into the reactor. When continuously introducing inert gas into the reactor, if the flow rate of the inert gas is too low, the resulting carbon nanostructures may take on a tube form because of the long residence time in the reactor. If the flow rate of the inert gas is too high, the carbon-containing compound is not sufficiently decomposed due to the short reaction time, and thus the carbon nanostructure cannot be formed. Thus, the flow rate of the inert gas may be set such that the space velocity of the inert gas is typically about 20-300 $h^{-1}$, and preferably about 24-260 $h^{-1}$, and more preferably about 32-240 $h^{-1}$.

In the present embodiment, the inner temperature of the reactor is controlled within a range at which the reactant can be pyrolyzed. The inner temperature of the reactor can be selected according to the composition of the reactant. If the inner temperature of the reactor is too low, pyrolysis of the reactant cannot occur. If the inner temperature of the reactor is too high, carbon nanotubes may be formed by a rapid carbonization reaction. The inner temperature of the reactor may be typically about 500-1000° C., and preferably about 550-950° C., and more preferably about 600-900° C.

When the reactant is sprayed into the reactor through the spray nozzle, the reactant in a solution or dispersion form is scattered. Then volatile ingredients in the reactant are readily vaporized and the pyrolyzable ingredients in the reactant are pyrolyzed.

The reactant may be discontinuously or continuously supplied to the reactor. Even when the reactant is continuously supplied to the reactor, the supply rate of the reactant is not limited. However, if the supply rate of the reactant is too low, nanocage particles cannot be formed because an insufficient amount of the carbon-containing compound in the reactant is decomposed by the catalyst. If the supply rate of the reactant is too high, the carbon nanocages may have a lower purity due to the presence of undecomposed carbon-containing compound in the reactant. Typically, the supply rate of the reactant may be set such that the space velocity of the reactant is preferably between about 0.012-0.2 $h^{-1}$.

The catalytic metal compound is decomposed to become catalytic metal particles. The catalytic metal particles accelerate the rate of pyrolysis of the carbon-containing compound and serves as a nucleus inducing the formation of carbon nanocages.

The carbon-containing compound is decomposed by the catalytic metal particles in the inert gas environment. Then, the resulting carbon is arranged on the catalytic metal nanoparticles or introduced into the catalytic metal nanoparticles to form a graphite layer.

When the catalytic ingredient comprising the reactant is a catalytic metal powder or catalytic metal precursor, the carbon nanocages may be formed around the catalytic metal particles. For example, the catalytic metal particles may be present inside the carbon nanocage particles or among the carbon nanocage particles. If the presence of the catalytic metal particles does not adversely affect the carbon nanocage, the carbon nanocage powder containing the catalytic metal particles can be used as a final product.

In another exemplary embodiment of the present invention, a method of preparing carbon nanocages may further comprise treating carbon nanocages containing the catalytic metal particles with an acidic solution to remove the catalytic metal particles.

The acidic solution may comprise any acid that can dissolve the catalytic metal particles without transforming the structure of the carbon nanocages. The acidic solution may comprise, but is not limited to nitric acid, an aqueous nitric acid solution, sulfuric acid, an aqueous sulfuric acid solution, hydrochloric acid, or a mixture thereof.

The acid treatment can be performed by immersing the carbon nanocages comprising the catalytic metal particles in an acidic solution. The mixture of the carbon nanocages comprising the catalytic metal particles and the acidic solution can be stirred in order to enhance and expedite the treatment. The stirring can be performed by a common stirring means such as a rotary stirrer, an ultrasonic vibrator, a mechanical mixer, and a homogenizer, for example.

The temperature of the acidic solution can be raised in order to enhance the rate of removal of the metal particles. The temperature can be selected according to ingredients of the acidic solution. For example, when using pure nitric acid, the temperature may be about 50-150° C.

The duration of the acid treatment of the carbon nanocages containing the catalytic metal particles is not limited as long as the catalytic metal particles can be effectively removed. Typically, the treatment time may be about 1-5 hours.

The present invention will now be described in greater detail with reference to the following examples. The following examples are for illustrative purposes only and are not intended to limit the scope of the invention.

EXAMPLE

An apparatus used in the present example is schematically illustrated in FIG. 1. The apparatus of FIG. 1 includes a reactant reservoir 1, an electronic pump 2, a gas flow meter 3, a spray nozzle 4, an electric furnace 5, a reactor 6, a product collecting container 7, and an exhaust filter 8. The reactant reservoir 1 is connected to the electronic pump 2. The reactor 6 is a quartz tube that is arranged vertically.

The electronic pump 2 controls the flow rate of the reactant. The gas flow meter 3 is connected to the reactant reservoir 1 and the electronic pump 2. The inert gas is supplied to the spray nozzle 4 through the gas flow meter 3. The spray nozzle 4 sprays the mixture of the reactant and the inert gas into the reactor 6. Thus, the reactant reservoir 1, the electronic pump 2, the gas flow meter 3, and the spray nozzle 4 constitute a "reactant supply part."

In the present example, the spray nozzle 4 is located in the upper portion of the reactor 6. The reactor 6 is fixed in the electric furnace 5, which is vertically arranged. The product collecting container 7 is located under the electric furnace 5. The exhaust filter 8 is fixed below the product collecting container 7. The reactor 6 is a quartz tube with a diameter of 30 mm and a length of 700 mm.

In the present example, a mixture of iron carbonyl and ethanol in a volumetric ratio of 1:5 was used as the reactant and nitrogen was used as the inert carrier gas. The inner temperature of the reactor 6 was raised to 650° C. using the electric furnace 5 while supplying nitrogen into the reactor 6 at a flow rate of 16 L/h. The reactant was supplied through the electronic pump 2 to the reactor 6 that was maintained at 650° C. at a rate of 6 mL/h. The reactant and nitrogen were mixed while passing through the spray nozzle 4. A crude product of carbon nanocages containing catalytic metal particles was obtained from the product collecting container 7.

The crude product was then immersed in pure nitric acid. This solution was heated to 100° C. with ultrasonic vibration for 1 hour. At this time, water was circulated for cooling and reflux. Then, the solution was gradually diluted with distilled water to reach an approximately neutral pH. Finally, the solution was filtered and dried to obtain a purified product of carbon nanocages.

Figure 2:
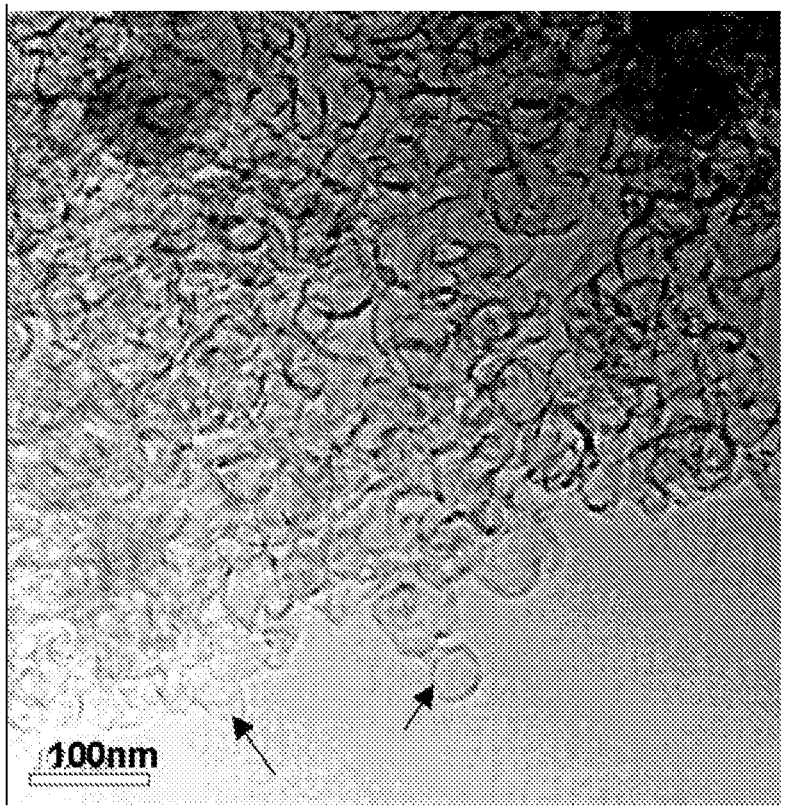
FIG. 2 is a transmission electron microscope (TEM) photograph of carbon nanocages that was obtained in an exemplary embodiment of the present invention.
Figure 3:
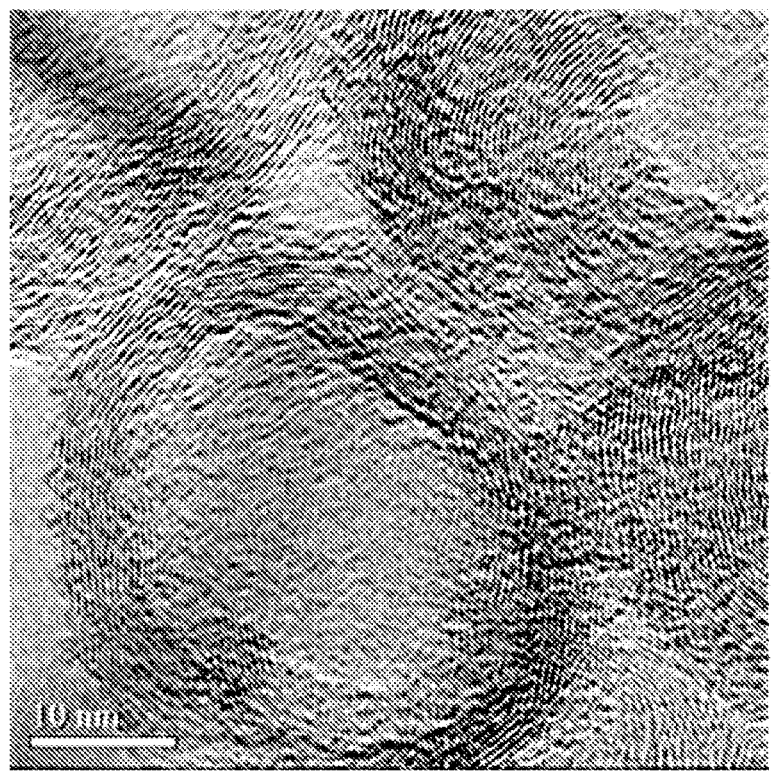
FIG. 3 is a high resolution TEM photograph of carbon nanocages that was obtained in an exemplary embodiment of the present invention.

FIG. 2 is a TEM photograph of the purified carbon nanocages product that was obtained in the present example. FIG. 3 is a high resolution TEM photograph of carbon nanocages product that was obtained in the present example.

Referring to FIG. 2 and FIG. 3, the carbon nanocage product obtained in the present example has a relatively uniform diameter of 40 nm and has 10-20 graphite layers.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of preparing carbon nanocages, comprising:
    introducing an inert gas into a reactor comprising a spray nozzle;
    raising the temperature of the reactor to a pyrolysis temperature of a catalyst compound; and
    spraying a reactant comprising the catalyst compound and a carbon-containing compound into the reactor through the spray nozzle,
    wherein the ratio of a space velocity of the inert gas to a space velocity of the reactant is 100 or more.

2. The method of claim 1, wherein the inert gas is helium, neon, argon, xenon, nitrogen or a mixture thereof.

3. The method of claim 1, wherein the space velocity of the inert gas is between 20-300 $h^{-1}$.

4. The method of claim 1, wherein the temperature of the reactor is between 500-1000° C.

5. The method of claim 1,
    wherein the amount of the catalyst compound in the reactant is between 10-50 parts by volume based on 100 parts by volume of the carbon-containing compound.

6. The method of claim 1,
    wherein the catalyst compound is a metal containing carbonyl compound, metallocene or a mixture thereof.

7. The method of claim 1,
    wherein the carbon-containing compound is selected from a group consisting of methanol, ethanol, acetone, and a mixture thereof.

8. The method of claim 1, wherein the space velocity of the reaction material is between 0.012-0.2 $^{-1}$.

9. The method of claim 1, wherein the carbon nanocages are polyhedral carbon clusters that are comprised of a plurality of graphite layers.

* * * * *